Nov. 15, 1966  W. E. CHOPE ETAL  3,285,544
MID-AIR REFUELING SYSTEM
Filed Feb. 26, 1964  3 Sheets-Sheet 1
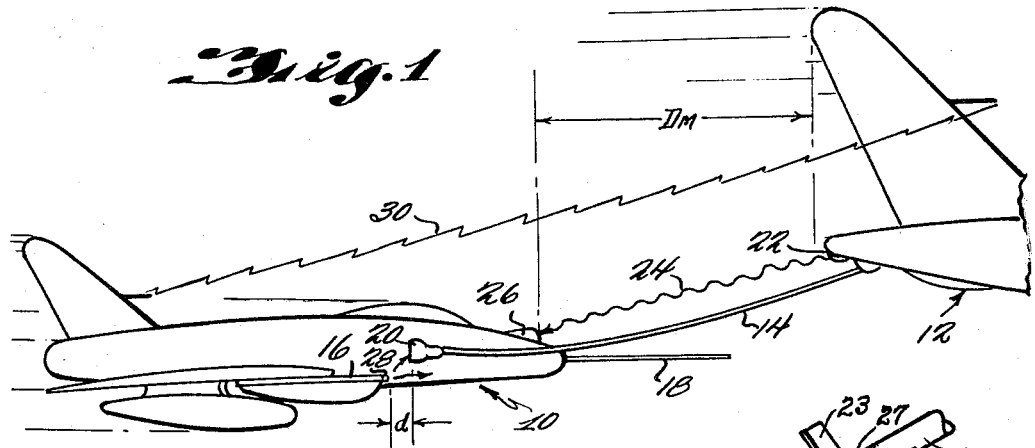
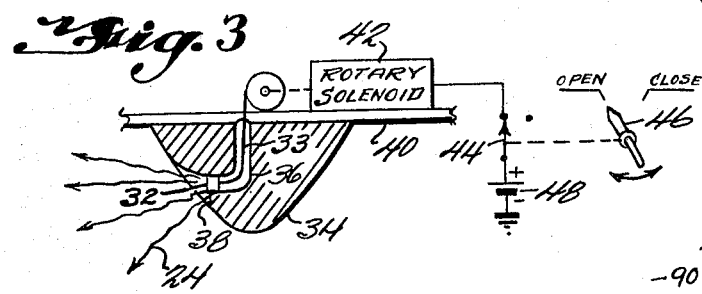
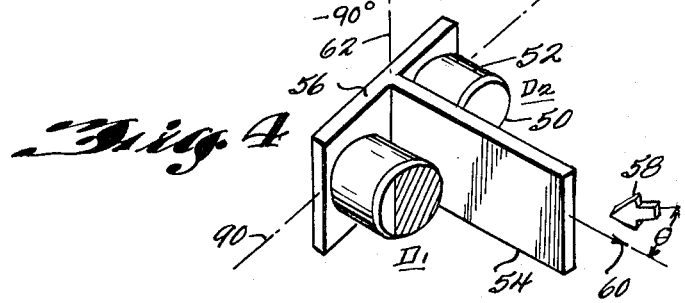
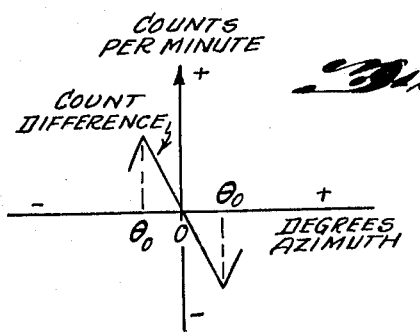
INVENTORS
WILBERT E. CHOPE
HENRY R. CHOPE
BY Charles M. Hutchins
ATTORNEY Nov. 15, 1966 W. E. CHOPE ETAL 3,285,544
MID-AIR REFUELING SYSTEM
Filed Feb. 26, 1964 3 Sheets-Sheet 2

INVENTORS
WILBERT E. CHOPE
HENRY R. CHOPE
BY Charles M. Hutchins
ATTORNEY

Nov. 15, 1966 W. E. CHOPE ETAL 3,285,544
MID-AIR REFUELING SYSTEM
Filed Feb. 26, 1964 3 Sheets-Sheet 3
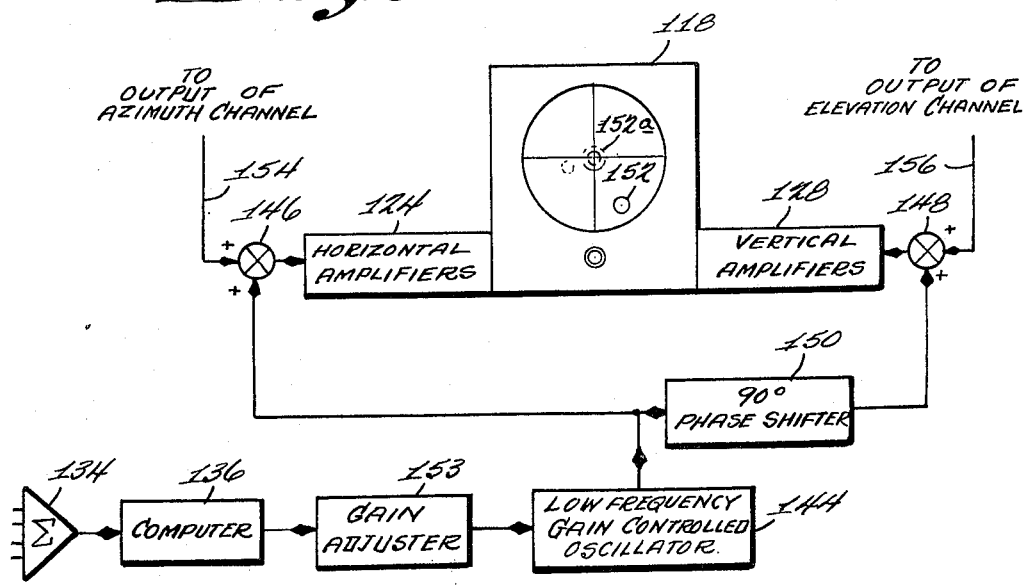
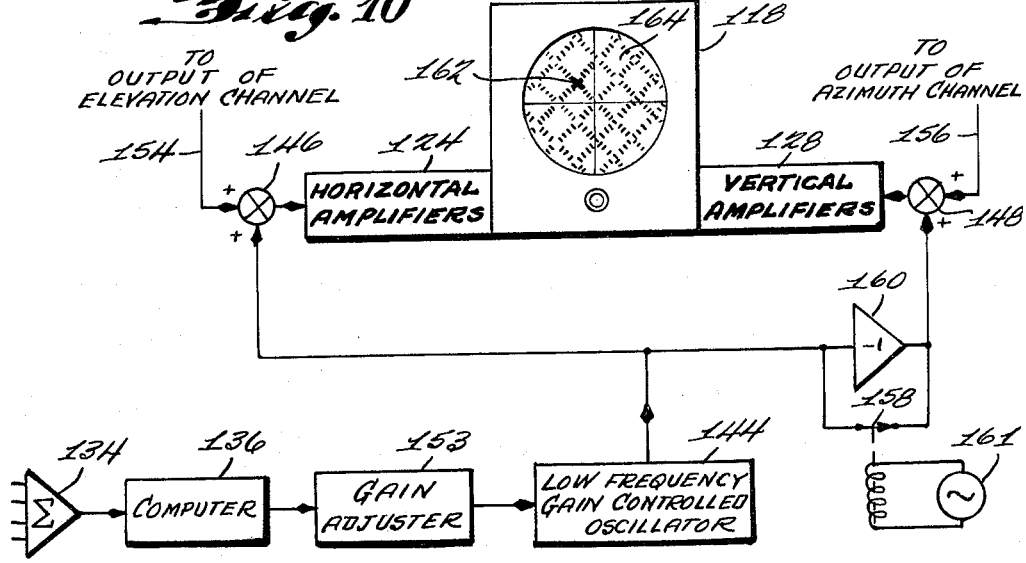
INVENTORS
WILBERT E. CHOPE
HENRY R. CHOPE
BY Charles M. Hutchins
ATTORNEY United States Patent Office 3,285,544
Patented Nov. 15, 1966

3,285,544
MID-AIR REFUELING SYSTEM
Wilbert E. Chope and Henry R. Chope, Columbus, Ohio, assignors to The Industrial Nucleonics Corporation, a corporation of Ohio
Filed Feb. 26, 1964, Ser. No. 347,442
18 Claims. (Cl. 244—135)

This invention relates generally to mid-air refueling between a tanker and one or more aircraft and more particularly to an improved nucleonics homing means for facilitating the refueling maneuver at close range and under all weather conditions.

It is a well-established procedure in military aircraft operations to send a jet tanker aloft to rendezvous with various tactical aircraft, at predetermined locations and times, and to refuel the tactical aircraft in flight. The tanker is usually provided with one or more refueling lines or a controllable telescoping boom that can be extended from the rear to trail several feet behind the tanker. Fighter aircraft are refueled via the refueling lines and bomber aircraft are refueled via the trailing rigid boom. A coupling member such as a funnel-shaped drogue is located on the end of each fuel line and is adapted to receive a refueling probe carried by the tactical fighter aircraft. The boom also carries a coupling device that releasably connects with an inlet pipe located on the bomber aircraft. Following standard practice, the pilot of each aircraft to be refueled first locates the tanker on his search radar and then uses his radar altimeter in a horizontal position to determine his range to closure. For the last half mile to hookup, the altimeter reading is no longer valid and the instrument is useless. From this point on, the pilot must make a visual sighting on the tanker and fly into the coupling member. Sometimes the tanker is equipped with an ultra-high frequency homing device but both this technique and that of the radar have the disadvantage of broadcasting the position of the tanker. This is especially serious since a large number of fighters, bombers and reconnaissance aircraft may be in the vicinity of the tanker, awaiting their turn to be refueled. Enemy surveillance having electronic detection gear would be able to easily locate these aircraft and direct the interception and destruction of a sizeable portion of the nation's airpower by simply homing in on a few of these tankers.

Since the refueling operation takes place at speeds up to several hundred miles per hour and in close proximity to the tanker, any miscue in judging distance may cause entanglement of the drogue line or collision of the aircraft. A flyby and another pass may be required. Since the aircraft to be refueled is likely to be already low on fuel, the amount required for one or more passes at the tanker may be more than the supply. If the miscue occurs over the ocean where there are no landing fields or carriers within range, the aircraft may have to be abandoned. Moreover, any maneuver which relies solely upon the visual acuity of the pilot and the drogue line operator, with the likelihood of loss of equipment and personnel in the event of a misjudgment, is highly undesirable. It should be pointed out that in the event of inclement weather, the operation cannot take place at all due to the limited visibility.

The present invention overcomes these disadvantages by providing both the aircraft pilot and the tanker refueling operator with close-in range, azimuth and elevation information of the tanker and the aircraft, thereby enabling latchup without mishap. Specifically, in accordance with the present invention, a nuclear source of radiation is provided on the tanker and nuclear detection equipment on the tactical aircraft. A direction-sensitive detector assembly is mounted on the aircraft to provide azimuth, elevation and range information on the tanker to the aircraft pilot by an oscillographic display, for example. For maximum effectiveness, the pilot would use his conventional radar and UHF homing devices to fly within approximately one-half mile of the tanker. He would then switch to his nuclear detection equipment and fly a pattern approaching the tanker from the rear and underneath to minimize the possibility of collision. It is important to realize that the sensitivity of the nuclear homing system increases at short range due to the increased radiation field near the source.

While a single source-detector pair may be sufficient to bring the aircraft close enough, say 50 feet, for a visual latchup, it may be desirable to provide a second short-range detector comprising another source of nuclear radiation mounted on the refueling probe of the aircraft and another direction-sensitive detector assembly mounted on the tanker coupling member. The probe position signals from the detector assembly can be used to inform the refueling line operator so that he can properly deploy and maneuver the coupling member with respect to the probe. Of course, this information can also be transmitted to the pilot via a communications link to further facilitate the coupling operation.

Accordingly, it is a primary object of the present invention to provide an improved in-flight refueling system that operates in the ranging gap not covered by radar or other known ranging methods.

It is also an object of the present invention to provide an improved in-flight refueling system that is operational in all kinds of weather.

It is another object of the present invention to provide an improved in-flight refueling system, the accuracy of which increases at short range.

It is still another object of the present invention to provide a nucleonics in-flight refueling system that cannot be detected by enemy surveillance.

These and other objects and advantages of the present invention will become more apparent upon reference to the following description when taken in conjunction with the accompanying drawings, in which:

FIG. 1 is a plan view of an in-flight refueling system using the nucleonics techniques of the present invention;

FIG. 2 is a partial perspective view of a bomber refueling system constructed in accordance with the present invention;

FIG. 3 is a sectional view of the radiation source used in the system of FIG. 1;

FIG. 4 is a perspective view of a radiation detector assembly having directional characteristics;

FIG. 5 is a graph illustrating the response of the detector assembly shown in FIG. 4;

FIG. 9 is a block diagram of an alternative readout technique; and,

FIG. 10 is a block diagram of a further alternative readout technique.

Figure 6:
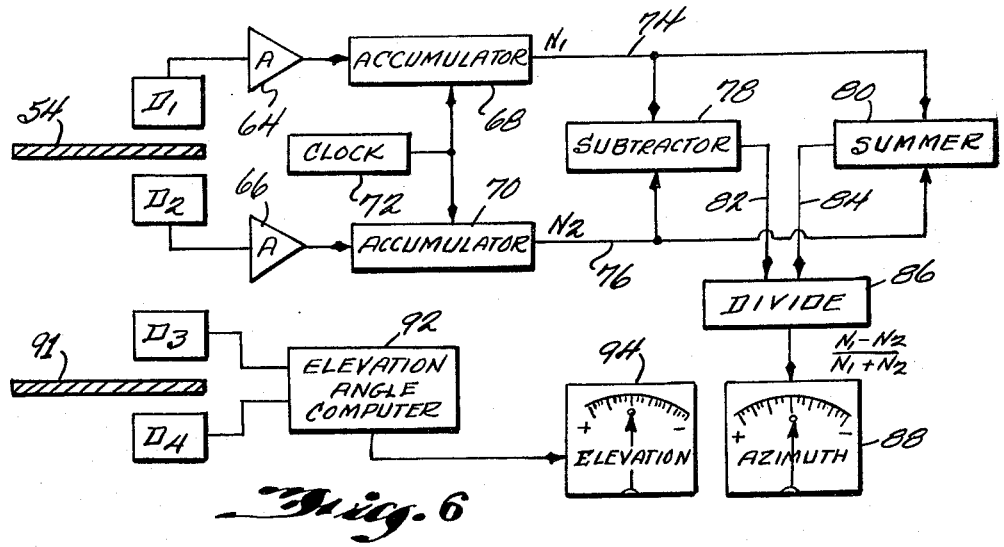
FIG. 6 is a block diagram showing the construction of readout apparatus useful in conjunction with the detectors shown in FIG. 4.

With reference now to the drawings and particularly to FIG. 1, there is shown an aircraft 10 to be refueled and a tanker 12 (partially shown) which carries a quantity of fuel to be dispensed through a fuel line 14 trailing rearwardly of the tanker. The fighter aircraft carries a refueling probe 16 on the forward edge of each of its wings and another probe 18 on the nose of its fuselage for use in a multicraft refueling operation. The fuel line 14 terminates in drogue member 20 adapted to receive the tip of probe 16. The tanker may carry up to three drogue lines, one trailing directly behind and one on either side. Three aircraft can be simultaneously refueled, if each pilot flies an appropriate one of his probes into the assigned drogue line.

In accordance with the present invention, a source of radiation 22 is mounted on the tanker preferably near the rear underside portion thereof to establish a radiation field 24 out the rear of the tanker. A directional-sensitive nuclear detector assembly 26 is mounted on the fuselage of the aircraft to pick up or intercept this radiation field from distances approaching several thousand feet. The detector assembly 26 described in detail hereinafter provides the pilot in the aircraft with information concerning his position relative to the tanker 12. Moreover, it informs him of his range to the tanker and signals him if he approaches too closely thereto.

While this single source-detector ensemble may be adequate to permit the pilot to make a visual latchup of the refueling probe with the drogue, it may be desirable to provide another source of radiation 28 on the tip of the refueling probes 16 and 18 and another detector assembly on the drogue 20. This source of radiation could be of lesser activity since it is to operate at a much shorter range. It is appreciated that the respective positions of the source and detector assemblies in either ensemble may be inter-changed. Use may be made of a communications link denoted by the irregular line 30 to relay drogue range and position information from the tanker to the aircraft or vice versa. If radio silence is required, the nucleonics communication system described in a co-pending application Serial No. 125,797, filed July 21, 1961, now Patent No. 3,123,714 by H. R. Chope and assigned to the same assignee as the present invention may be used.

Conventional bomber refueling apparatus is shown in FIG. 2. In this type of refueling operation, an inlet pipe 17 mounted in the upper part of the fuselage toward the front of the bomber is uncovered to receive a trailing boom nozzle 19. Nozzle 19 telescopes into a flexible joint at the end of a rigid boom 21. The boom can be flown by an operator in the tanker by adjusting the position of a pair of stabilizer fins 23. In accordance with the present invention a source of radiation 25 is mounted on the end of the inlet pipe 17 and a directional detector assembly 27 is mounted on the end of the boom 21. This relatively close range system is, of course, supplemented by the long range detector assembly 29 that responds to the radiation field 24 provided by the tanker-mounted source 22.

Referring now to FIG. 3 and describing the fighter refueling operation, the tanker-mounted source of radiation 22 may comprise a radioisotope 32 such as cobalt 60 fastened to the end of a stiff rectractable wire 33. The source may be positioned in a lead housing 34 having a curved hole 36 terminating in an open radiation exit 38. The lead housing 34 may be fastened to the fuselage 40 of the tanker and a rotary solenoid 42 may be used to retract the source by winding up the wire 33. When the tanker is not on a mission, the solenoid 42 may be de-energized by means of a switch 44 controlled by the knob 46 and used to disconnect a battery 48.

In briefly examining the mathematical relationships involved here, if the radiation 24 is isotropic as from a point source, the functional relationship of photon counts with distance becomes $$N = \frac{3.7 \times 10^{10} C e^{-R/\lambda}}{4\pi R^2} g(R/\lambda) \quad (1)$$

at the detector.
Where:

$N$ = number of photon counts per second,
$R$ = radical distance, in feet, from the source to the detector,
$C$ = activity of the source, in curies, and
$g(R/\lambda)$ is a function related to the "build-up" factor which accounts for the additional secondary photons resulting from the Compton scattering process. The characteristic length $\lambda$ of cobalt 60 gamma photons in air at sea level is about 450 ft.

From Equation 1 it can be seen that an increase in the activity, $C$, will cause an increase in range $R$ for the same photon count $N$. However, one is not only fighting the problem of an inverse square loss, but also the $e^{-R/\lambda}$ loss. The "build-up" factor $g(R/\lambda)$ to a degree compensates for some of these losses as it increases with range, but at the distances under consideration, it is proportional to range.

Other sources of radiation may be used in place of cobalt 60. Sources providing radiation in different energy bands may be mounted on different tankers. By using known energy discrimination techniques in the aircraft detector assemblies, it is possible for aircraft to rendezvous with a particular one of the tankers, if that is a mission requirement.

The directional sensitive detectors for the radiation emitted by the cobalt source 32 may be constructed as shown in FIG. 4. This view shows a pair of detecting elements $D_1$ and $D_2$, each including a scintillation crystal 50 and photomultiplier tube 52 positioned on either side of a longitudinally extending shield 54. This shield is fastened to a back plate member 56. If radiation is incident from the direction denoted by the large arrow 58, detector $D_2$ will be substantially illuminated by said radiation and the other detector will be partially in a shadow created by the shield 54. Therefore, the count rate of the two detectors will be different. By taking the difference in the count rate and dividing by the sum of the respective count rates to normalize the computation, it is possible to provide a signal which is proportional only to the angle $\theta$ at which the radiation is striking the median plane or pointing axis 60 of the device. It is apparent that the detector assembly shown in FIG. 4 determines only an azimuth error signal. There is a maximum angle beyond which one detector is completely shadowed and the difference in the count rate yields no further useful information. As can be seen from FIG. 5, angles greater than $\theta_0$ cannot be resolved without ambiguity. Further details of this detection technique may be found by referring to a co-pending application Serial No. 271,342 filed April 8, 1963 by A. Campanella and assigned to the same assignee as the present invention.

Referring now to FIG. 6, in response to radiation, the detectors $D_1$ and $D_2$ generate a number of pulses which are amplified and shaped at 64 and 66. These pulses are accumulated at 68 and 70 and readout periodically by means of a clock generator 72 gating the accumulator devices. Signals proportional to the number of counts per unit time $N_1$ and $N_2$ in each detector path may be provided on lines 74 and 76 respectively. The signals are subtracted by unit 78 and added by a summer 80. The difference signal on line 82 is divided by the sum signal on line 89 by the divider unit 86. By this technique, the readout is normalized and the resulting indication does not vary with the distance of the detectors from the source. Accordingly, a meter 88 may be provided to indicate the direction in azimuth of the source relative to the pointing axis 60 within the aforesaid limits of $\pm \theta_0$. To determine elevation, it is necessary to re-orient the detector assembly of FIG. 4 by rotating the unit 90° about the pointing axis 60 until the vertical axis 62 is coincident with the imaginary horizontal line 90. An elevation error signal can then be derived by detectors $D_1$ and $D_2$. Alternatively, another pair of detectors $D_3$ and $D_4$ and interposed shield plate 91 can be used as illustrated in FIG. 6. An elevation angle computer 92 similar in construction to that described above may provide a signal indicative of the elevation of the source relative to the nose of the aircraft. This elevation error signal can be readout on a meter 94. The meters 88 and 94 can be mounted in the pilot's cockpit to advise him of his position relative to the tanker. The pilot in the aircraft is thus provided with enough information for maneuvering close to the tanker.

Figure 7:
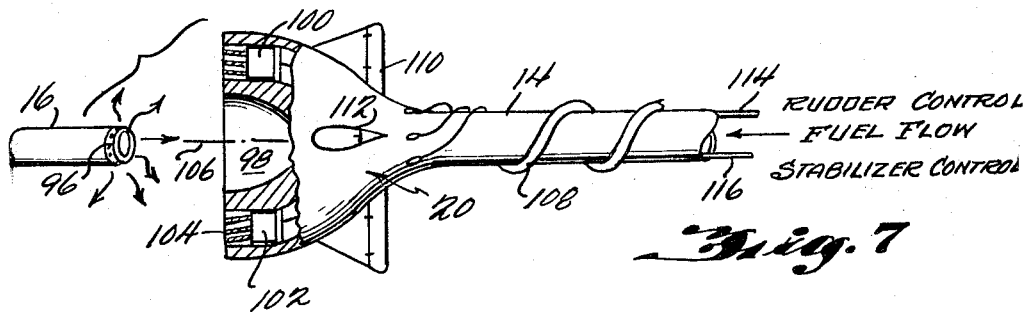
FIG. 7 is an enlarged view, partly sectional, showing the mechanical construction of the drogue member constructed in accordance with the present invention.

At this short range, the drogue-aircraft position sensing device shown in FIG. 7 will be preferred. Here a small quantity of radioactive material 96 is deposited on the tip of the refueling probe 16 and the funnel-shaped drogue 20 is provided with four detectors spaced around a centrally located cavity 98 constructed to receive the probe tip. Only a pair of elevation detectors 100 and 102 are shown. Mounted on the front of each detector is a plurality of spaced and slanted collimating slats 104 so aligned as to preferably direct radiation into the detectors from an angle slightly off the central axis 106 of the drogue member. This type of directional sensor is more fully described in a co-pending application to John J. Lentz, Serial No. 272,182, filed April 8, 1963 and assigned to the same assignee as the present invention. The other pair of detectors (not visible) are similarly constructed and mounted on either side of the central opening 98. These detectors provide a signal indicative of the sideways displacement of the drogue 20 relative to the probe 16. The detector outputs can be connected to readout equipment in the tanker by means of a cable 108 wrapped around the refueling line 14. The probe position information can be relayed from the tanker back to the fighter by the aforementioned communications link. However, it may be preferable in certain operations to provide a manually-operated drogue controlled by the personnel within the tanker itself. For this purpose rudder and stabilizer members respectively designated by reference numerals 110 and 112 may be added to the outside of the drogue member 20. Wires 114 and 116 are mechanically linked to the drogue control members to enable manipulation of the drogue's position by the drogue line operator stationed in the tanker. Having described in detail the fighter refueling system the incorporation of the present invention in the refueling of bomber aircraft will be obvious to those skilled in the art.

Figure 8:
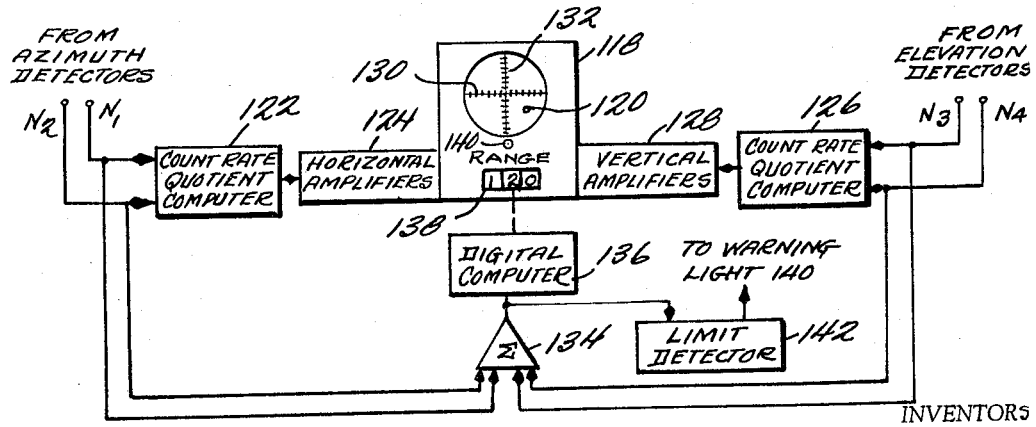
FIG. 8 is a block diagram of an improved readout technique.

In FIG. 8 a preferred form of display may comprise an oscilloscope 118 having a screen on which the position of the tanker may be represented by an illuminated spot 120. The screen may be calibrated in degrees of azimuth horizontally and degrees of elevation vertically. In this manner the position of the spot is indicative of the position of the tanker. This is accomplished by feeding the outputs $N_1$ and $N_2$, from the azimuth detectors $D_1$ and $D_2$ and associated counting circuits, to a quotient computing unit 122 that in turn drives the horizontal amplifiers 124 and the deflection circuits of the oscilloscope 118. The elevation channel similarly includes a count rate quotient computer 126 and feeds a vertical amplifier unit 128 of the oscilloscope. Count rate quotient computer 126 receives signals proportional to the count rates $N_3$ and $N_4$ derived by detectors $D_3$ and $D_4$. In this manner, the deflection of the spot up or down relative to the horizontal line 130 is proportional to the voltage existing at the output of the elevation channel and the deflection to the left or right of the vertical line 132 is proportional to the voltage existing at the output of the azimuth channel.

It is desirable for the pilot to know not only his relative position with the tanker but also his range therefrom. Since the total radiation field existing at the detector is a function of its distance from the source, the individual count rates $N_1$, $N_2$, $N_3$, and $N_4$ are summed in an amplifier 134. The exact functional relationship between range and total counts per minute can be experimentally determined and a range computer 136 can be programmed accordingly. The output of computer 136 can be readout by a digital voltmeter, for example, providing the visual indication 138 shown under the front panel position marker. It is also important that the aircraft approach the tanker no closer than the distance $D_M$ shown in FIG. 1, for this is the minimum safe approach distance. To inform the pilot when he has approached closer than what is advisable, a warning light 140 can be installed on the face of the oscilloscope 118. A simple amplitude limit detector 142 monitors the output of summing amplifier 134 and energizes the light 140 whenever the amplifier output signal exceeds a predetermined amplitude calculated in accordance with the minimum safe distance $D_M$.

It may be preferable to improve the presentation by eliminating the separate and dual readout of information. It is further proposed to present both the range and the position information in a united display. In this technique, the electron beam generated in the oscilloscope is made to trace out a small circle whose diameter is a function of the range to the source and whose center is located at the calculated values of azimuth and elevation. To this end, referring to FIGS. 9 and 10; a small A.C. signal is provided by an oscillator 144 and superimposed on both the vertical and horizontal amplifier circuits of the oscilloscope along with the elevation and azimuth signals by means of signal summing devices 146 and 148. However, to draw a circle it is required to phase shift the A.C. signal supplied to either the vertical or horizontal amplifiers so that they bear a time quadrature relationship. Therefore, in FIG. 9, a 90° phase shift network 150 is inserted in the signal path to the vertical amplifiers 128. The frequency of the oscillator output signal determines the scanning rate of the electron beam around the circle 152 and the amplitude of the oscillator output determines the diameter of scan. Accordingly, the output of the detector summing amplifier 134 can be coupled to a gain adjuster 153 that is operative to change the gain of the oscillator 144 so that the size of the circle decreases as the source is approached. The gain adjuster 153 might be a servomechanism for varying an oscillator output potentiometer tap or any of the known electronic devices for altering the operating bias on the oscillator 144. It can be seen that if the detectors are pointed directly at the source, the D.C. signals on lines 154 and 156 will be zero and the circle traced will be centered about the origin as indicated at 152a. Then as the target is approached, the summed signal will increase and the circle traced will be smaller. Alternatively, the size of the circle may be made to increase as the range becomes less. However, in this case there may be some difficulty in calibrating the scope face so that the diameter can be read off in units of range such as hundreds of feet, for example.

To eliminate this problem, the cross-marking technique shown in FIG. 10 may be employed. In this embodiment, the output of the oscillator going to the vertical amplifiers 128 is provided alternately in-phase and 180° out of phase with the signal coupled to the horizontal amplifiers 124. This can be accomplished by means of a vibrating switch 158 periodically shorting out a unity gain inverter amplifier 160 connected between the oscillator 144 and the horizontal amplifiers 128. Switch 158 may be driven by a coil 159 energized by an A.C. source 161. When the switch is closed, the signals to both the horizontal and vertical circuits are in phase causing the beam to draw a line at a 45° angle with the horizontal reference. When the switch is opened, the signals sent to the respective deflection circuits bear an anti-phase relationship and a line of the same length is drawn perpendicular to the previous trace and intersects the same at the computed angles of azimuth and elevation. The persistence of the screen phosphor must be long enough with respect to the switching period to sustain a cross mark 162. If the scale 164 is to be calibrated, it is necessary to decrease the gain of the low-frequency oscillator as the range to closure becomes less.

The present invention could be used to refuel ships underway at sea or in other military or non-military refueling operations wherein it is required to couple one member with another in an environment precluding visual observation of the coupling operation.

The present invention is described in conjunction with

What is claimed is:

1. A mid-air refueling system comprising:
a tanker having a drogue-tipped refueling line extending rearwardly thereof,
an aircraft to be refueled having a probe extending to the front of said aircraft for engaging said refueling drogue,
nuclear radiation generating and detecting means mounted on said tanker and said aircraft respectively for generating a first signal indicative of the position of said tanker relative to said aircraft and a second signal indicative of the position of said refueling drogue relative to said probe, and
means for displaying said signals to the operators of said aircraft and said refueling line to facilitate said probe engaging function.

2. Apparatus as set forth in claim 1 in which said nuclear radiation generating means comprises a source of nuclear radiation and said detecting means comprises two pairs of detectors for said radiation,
one pair generating a signal proportional to the elevation of said source relative to said detecting means, and the other pair generating a signal proportional to the azimuth of said source relative to said detecting means,
and means for summing the output signals of said detector pairs to determine the range of said detectors from said source.

3. Apparatus for aiding the mid-air refueling of one or more aircraft from a tanker trailing a refueling drogue, said apparatus comprising:
a first source of nuclear radiation mounted on the rear of said tanker,
a first detector assembly mounted on said aircraft for providing a first signal indicative of the position of said tanker relative to said aircraft,
a probe mounted on said aircraft to engage said refueling drogue,
a second source of nuclear radiation mounted on said probe,
a second detector assembly mounted on said refueling drogue for providing a second signal indicative of the position of said probe relative to said drogue, and,
means utilizing said first and second position signals for effecting said probe engagement with said refueling drogue.

4. Apparatus as set forth in claim 3 in which said sources of nuclear radiation each comprise a radioisotope material.

5. Apparatus as set forth in claim 3 in which each of said detector assemblies comprises:
two pairs of radiation detectors
a radiation shield separating said detectors in each of said pairs and extending in the direction of said source.

6. Apparatus as set forth in claim 3 in which said utilization means comprises an oscilloscope receiving said position signal and visually displaying azimuth, elevation and range data for operating personnel.

7. Apparatus for aiding the mid-air refueling of one or more aircraft from a tanker bearing fuel, said tanker trailing a fuel line terminating in a drogue member and each of said aircraft having a probe for engaging said drogue member, said apparatus comprising:
a source of nuclear radiation mounted on one of said drogue member and said probe,
a detector assembly mounted on the other of said drogue and said probe for providing a signal indicative of the relative position of said drogue member relative to said probe, and
means receiving said signal for visually presenting said position information to the operators of said aircraft and said drogue member thereby facilitating said probe engagement with said drogue member.

8. Apparatus for aiding the mid-air refueling of one or more aircraft from a tanker bearing fuel, said tanker trailing a fuel line terminating in a drogue member and each of said aircraft having a probe for engaging said drogue member, said apparatus comprising:
a first source of nuclear radiation mounted on the other of said tanker and one of said aircraft to be refueled,
a first detector assembly mounted on the other of said tanker and one of said aircraft to be refueled for providing a first signal indicative of the position range of said tanker relative to said aircraft,
a second source of nuclear radiation mounted on one of said drogue member and said probe and,
a second detector assembly mounted on one or the other of said drogue member and said probe, for providing a second signal indicative of the position of said drogue relative to said probe.

9. Apparatus for aiding the mid-air refueling of one or more aircraft from a tanker bearing fuel, said tanker trailing a fuel line terminating in a drogue member and each of said aircraft having a probe for engaging said drogue member, said apparatus comprising:
a first source of nuclear radiation mounted on the other of said tanker and one of said aircraft to be refueled,
a first detector assembly mounted on the other of said tanker and one of said aircraft to be refueled for providing a first signal indicative of the position range of said tanker relative to said aircraft,
a second source of nuclear radiation mounted on one of said drogue member and said probe,
a second detector assembly mounted on one or the other of said drogue member and said probe for providing a second signal indicative of the position of said drogue relative to said probe, and
means receiving said first and said second signals for visually presenting said position information to the operators of said aircraft and said drogue member respectively to facilitate said probe engagement with said drogue member.

10. In a system for aiding the mid-air refueling of one or more aircraft from a tanker trailing a fuel line for dispensing fuel and terminating in a first coupling member, each of said aircraft having a fuel receiving member extending forwardly of said aircraft and terminating in a second coupling member, apparatus for aligning said first and second coupling members comprising:
a source of nuclear radiation mounted on one of said first and said second coupling members, and
a detector assembly mounted on the other of said first and said second coupling members for determining the position of said first coupling member relative to said second coupling member.

11. In a system for aiding the mid-air refueling of one or more aircraft from a tanker trailing a fuel line for dispensing fuel and terminating in a first coupling member, each of said aircraft having a fuel receiving member extending forwardly of said aircraft and terminating in a second coupling member, apparatus for aligning said first and second coupling members comprising:
a source of nuclear radiation mounted on one of said first and said second coupling members,
a detector assembly mounted on the other of said first and said second coupling members for determining the position of said first coupling member relative to said second coupling member, and
means for utilizing said relative position determination to control the respective movements of said aircraft relative to said tanker.

12. In a system for aiding the mid-air refueling of one or more aircraft from a tanker trailing a fuel line for dispensing fuel and terminating in a first coupling member, each of said aircraft having a fuel receiving member extending forwardly of said aircraft and terminating in a second coupling member, apparatus for aligning said first and second coupling members comprising:
   a far range and position sensor including,
   a first source of nuclear radiation mounted on one of said tanker and said aircraft, and
   a first detector assembly mounted on the other of said tanker and said aircraft providing a first signal indicative of the position of said tanker relative to said aircraft,
   a close range and position sensor including,
   a second source of nuclear radiation mounted on one of said first and second coupling members, and
   a second detector assembly mounted on the other of said first and said second coupling members providing a second signal indicative of the position of said first coupling member relative to said second coupling member.

13. In a system for aiding the mid-air refueling of one or more aircraft from a tanker trailing a fuel line for dispensing fuel and terminating in a first coupling member, each of said aircraft having a fuel receiving member extending forwardly of said aircraft and terminating in a second coupling member, apparatus for aligning said first and second coupling members comprising:
   a far range and position sensor including,
   a first source of nuclear radiation mounted on one of said tanker and said aircraft and a first detector assembly mounted on the other of said tanker and said aircraft providing a first signal indicative of the position of said tanker relative to said aircraft,
   a close range and position sensor including,
   a second source of nuclear radiation mounted on one of said first and second coupling members and,
   a second detector assembly mounted on the other of said first and said second coupling members providing a second signal indicative of the position of said first coupling member relative to said second coupling member, and
   means for utilizing said first and said second signals in sequence to control the movements of said aircraft relative to said tanker and said first coupling member relative to said coupling member respectively.

14. The subcombination as set forth in claim 13 in which each of said first and said second sources of radiation comprises a radioisotope.

15. The subcombination as set forth in claim 13 in which each of said detector assemblies comprises:
   a first pair of detectors separated by a first shielding material extending toward said radiation source associated therewith,
   a second pair of detectors separated by a second shielding material mounted perpendicular to said first shielding material and extending toward said associated source, and
   means receiving the outputs of said detectors for computing azimuth, elevation, and range information on said associated source.

16. A mid-air refueling system comprising
   a tanker having a refueling boom extending rearwardly thereof,
   an aircraft to be refueled having coupling means for engaging the end of said boom,
   nuclear radiation generating and detecting means mounted on said tanker and said aircraft for generating a first signal indicative of the position of said tanker relative to said aircraft and a second signal indicative of the position of said end of said refueling boom relative to said coupling means, and
   means for displaying said signal to the operators of said aircraft to facilitate said boom engaging function with said coupling means.

17. Apparatus as set forth in claim 16 in which said nuclear radiation generating means comprises:
   a source of nuclear radiation and said detecting means comprises two pairs of detectors for said radiation,
   one pair generating a signal proportional to the elevation of said source relative to said detecting means, and the other pair generating a signal proportional to the azimuth of said source relative to said detecting means,
   and means for summing the output signals of said detector pairs to determine the range of said detectors from said source.

18. Apparatus for aiding the mid-air refueling of one or more aircraft from a tanker trailing a refueling boom, said apparatus comprising:
   a first source of nuclear radiation mounted on the rear of said tanker,
   a first detector assembly mounted on said aircraft for providing a first signal indicative of the position of said tanker relative to said aircraft,
   coupling means mounted on said aircraft to engage the end of said boom,
   a second source of nuclear radiation mounted on said coupling means,
   a second detector assembly mounted on said refueling boom for providing a signal indicative of the position of said coupling means relative to said end of said boom, and
   means utilizing said first and second position signals for effecting said probe engagement with said refueling drogue.

References Cited by the Examiner
UNITED STATES PATENTS

| | | | |
|---|---|---|---|
| 2,859,002 | 11/1958 | Leisy | 244—135 |
| 2,987,621 | 6/1961 | Mielziner et al. | 250—71.5 |
| 2,992,330 | 7/1961 | Cooper et al. | |
| 3,124,690 | 3/1964 | Savin. | |
| 3,145,949 | 8/1964 | Smith | 244—14 |

FOREIGN PATENTS

| | | |
|---|---|---|
| 1,286,237 | 1/1962 | France. |
| 926,613 | 5/1963 | Great Britain. |

MILTON BUCHLER, *Primary Examiner.*

FERGUS S. MIDDLETON, *Examiner.*

D. NOON, B. BELKIN, *Assistant Examiners.*

UNITED STATES PATENT OFFICE
CERTIFICATE OF CORRECTION

Patent No. 3,285,544                          November 15, 1966

Wilbert E. Chope et al.

It is hereby certified that error appears in the above numbered patent requiring correction and that the said Letters Patent should read as corrected below.

Column 3, line 74, for "radical" read -- radial --.

Signed and sealed this 12th day of September 1967.

(SEAL)
Attest:

ERNEST W. SWIDER
Attesting Officer

EDWARD J. BRENNER
Commissioner of Patents